United States Patent [19]
Zeitman

[11] Patent Number: 5,940,481
[45] Date of Patent: *Aug. 17, 1999

[54] PARKING MANAGEMENT SYSTEM

[75] Inventor: Shlomo Zeitman, 51 Nili Street, Raanana, Israel, 43206

[73] Assignee: Shlomo Zeitman, Raanana, Israel

[*] Notice: This patent issued on a continued prosecution application filed under 37 CFR 1.53(d), and is subject to the twenty year patent term provisions of 35 U.S.C. 154(a)(2).

[21] Appl. No.: 08/795,969

[22] Filed: Feb. 5, 1997

[30] Foreign Application Priority Data

Jul. 21, 1996 [IL] Israel ......................................... 118898

[51] Int. Cl.⁶ .................................................. H04M 15/00
[52] U.S. Cl. .......................... 379/114; 705/13; 340/932.2
[58] Field of Search ........................ 379/106.01, 106.11, 379/114, 112, 116, 119, 144, 265, 266, 309; 340/932, 932.2, 933, 937, 938, 825.28; 705/5, 6, 13, 15

[56] References Cited

U.S. PATENT DOCUMENTS

| | | | |
|---|---|---|---|
| 3,378,151 | 4/1968 | Salloum | 214/16.1 |
| 3,382,990 | 5/1968 | Salloum | 214/16.1 |
| 4,029,218 | 6/1977 | Matsuura | 214/16.1 |
| 5,029,094 | 7/1991 | Wong | 364/467 |
| 5,034,739 | 7/1991 | Gruhl | 340/932.2 |
| 5,159,163 | 10/1992 | Bahjat et al. | 340/147 |
| 5,253,165 | 10/1993 | Leiseca et al. | 364/407 |
| 5,339,000 | 8/1994 | Bashan et al. | 340/932.2 |
| 5,351,187 | 9/1994 | Hassett | 364/401 |
| 5,402,475 | 3/1995 | Lesner, Jr. et al. | 379/106 |
| 5,414,624 | 5/1995 | Anthonyson | 364/424.01 |
| 5,432,508 | 7/1995 | Jackson | 340/942 |
| 5,488,360 | 1/1996 | Ray | 340/933 |
| 5,500,515 | 3/1996 | Farmont | 235/384 |
| 5,648,906 | 7/1997 | Amirpanahi | 364/464.28 |
| 5,659,306 | 8/1997 | Bahar | 340/932.2 |
| 5,710,557 | 1/1998 | Schuette | 340/932.2 |
| 5,740,050 | 4/1998 | Ward | 705/13 |
| 5,745,052 | 4/1998 | Matsuyama | 705/13 |
| 5,748,107 | 5/1998 | Kersken et al. | 340/932.2 |
| 5,751,973 | 5/1998 | Hassett | 705/13 |
| 5,770,845 | 6/1998 | Hjelmvik | 705/13 |
| 5,774,569 | 6/1998 | Waldenmaier | 382/100 |

FOREIGN PATENT DOCUMENTS

| | | | |
|---|---|---|---|
| 4433982 | 10/1995 | Germany | 340/932.2 |
| 91897 | 10/1989 | Israel . | |

*Primary Examiner*—Curtis A. Kuntz
*Assistant Examiner*—Rexford N. Barnie
*Attorney, Agent, or Firm*—Ladas & Parry

[57] ABSTRACT

A parking management communication system including a central control unit having a data base, a central interface unit and at least one user interface unit, the central interface unit being in communication with the at least one user interface unit via at least one of a wired and wireless communication link.

6 Claims, 3 Drawing Sheets

PARKING MANAGEMENT SYSTEM

FIELD OF THE INVENTION

The present invention relates to parking management systems, in general, and particularly to communication systems for parking management systems.

BACKGROUND OF THE INVENTION

The ever-increasing use of automobiles and limited space for parking, particularly in urban areas, has led to serious problems in parking management. It is often expensive and logistically cumbersome for police or municipality officials to keep track of offenders who park their vehicles without paying for the parking space. Parking meters do not fully solve the problem because they require a large investment on the part of the municipality and comprehensive monitoring by enforcement personnel.

Another parking management problem is the ever-growing lack of parking space available. It is difficult, if not impossible, for a driver wishing to travel to an urban district to know ahead of time if there will be available parking space. In short, there is a lack of communication in the field of parking management, between municipality, driver and parking space.

SUMMARY OF THE INVENTION

The present invention seeks to provide a parking management communication system, encompassing municipality, driver and parking space. The communication system of the present invention may be used to report parking, monitor parking and reserve parking spaces. The present invention also allows law enforcement officials to monitor parking facilities with greater ease and expediency.

It is noted that throughout the specification and claims, a parking facility includes any parking space or parking lot, private or public.

There is thus provided in accordance with a preferred embodiment of the present invention, a parking management communication system including a central control unit having a data base, a central interface unit and at least one user interface unit, the central interface unit being in communication with the at least one user interface unit via at least one of a wired and wireless communication link.

In accordance with a preferred embodiment of the present invention, the data base includes at least one of the following data: parking facility identity, parking facility availability of a certain region, vehicle identification, user identification, billing information, time related information of use of a parking facility, and law enforcement information.

The communication link may include telephone lines, wireless telephone links, communication network systems, such as the Internet, and/or citizen band radio.

Additionally in accordance with a preferred embodiment of the present invention, the communication system includes billing apparatus for billing a user for use of the parking facility. Preferably, a telephone account of the user is charged for use of the parking facility.

Further in accordance with a preferred embodiment of the present invention, the communication system includes a law enforcement interface unit for monitoring authorized use of the parking facility.

There is also in accordance with a preferred embodiment of the present invention, a method for parking reporting including parking a vehicle at a parking facility, and reporting to a central control unit parking data including vehicle and/or user identity and time of parking. The reporting may be done by any known communications link, such as telephone, cellular telephone, mobile telephone, or Internet.

In accordance with a preferred embodiment of the present invention, the exact location of the parking facility is not reported. In accordance with another preferred embodiment of the present invention, the exact location of the parking facility is reported. The method may further include billing the user for use of the parking facility, such as charging the user's telephone account.

There is also in accordance with a preferred embodiment of the present invention, a method for monitoring use of a region of parking facilities including providing a central control unit having a data base and a central interface unit, the central interface unit being in communication with the parking facilities, and communicating with the central control unit so as to receive a report of which parking facilities are being used and which are vacant. Preferably the method further includes selecting only those parking facilities which the central control unit reports as being vacant and filing a traffic report against a vehicle using a vacant parking facility without authorization.

There is also provided in accordance with a preferred embodiment of the present invention, a method for reserving a parking facility including communicating a reservation request to a central control unit, causing the central control unit to provide a user with a map of a region in which the user is interested in parking, selecting a parking facility and sending a message to the central control to reserve the parking facility. The central control unit then registers the reservation. The next time a potential user, other than the user who registered the reservation, wishes to park in the reserved parking facility and communicates with the central control unit, the potential user will receive a message that the facility is already reserved and not authorized for use. The user who registered the reservation, upon parking his vehicle in the reserved facility, reports his identification number to the central control unit and receives confirmation of authorization to park there.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
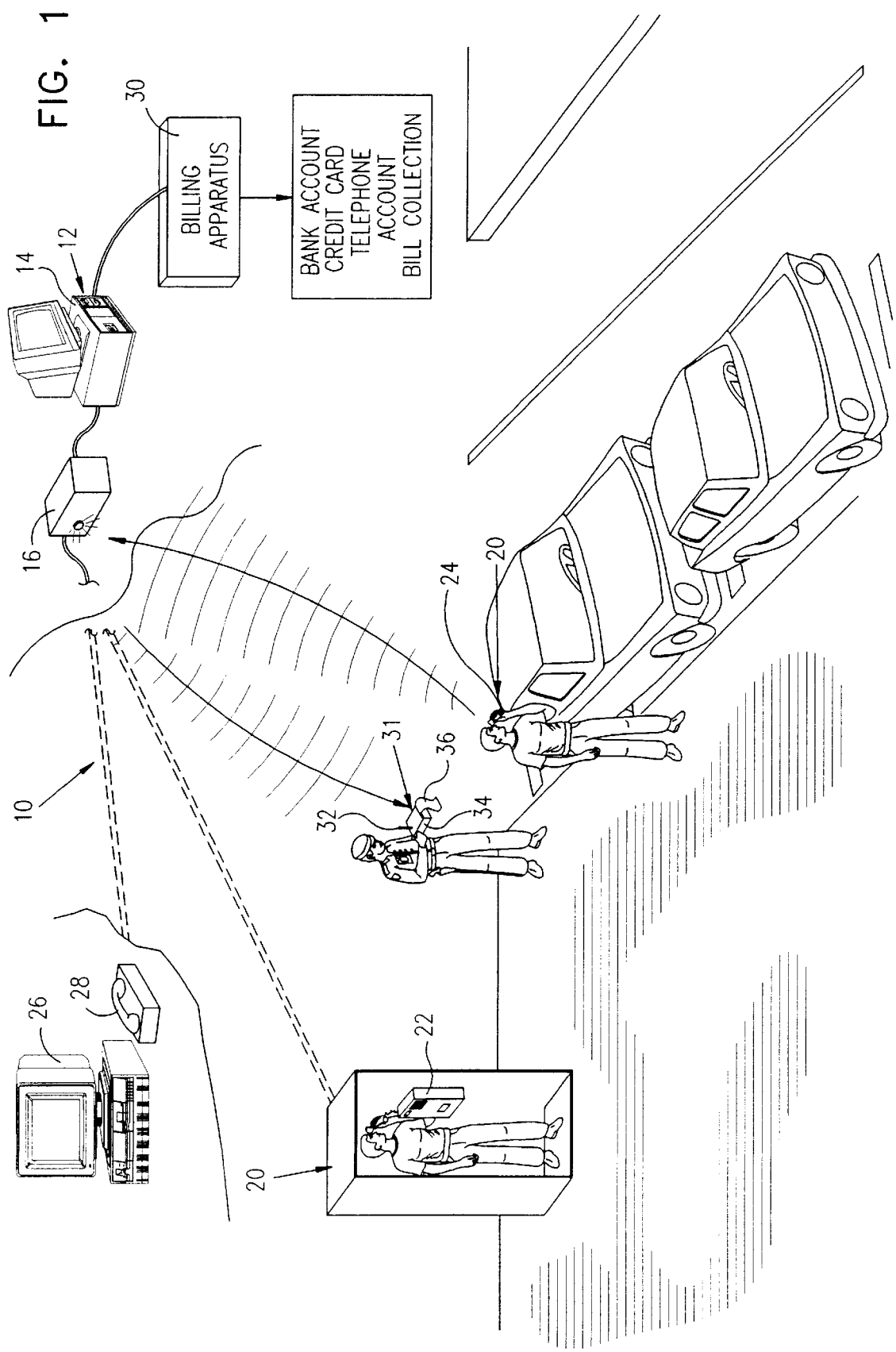
FIG. 1 is a simplified pictorial illustration of a parking management communication system, constructed and operative in accordance with a preferred embodiment of the present invention.

Reference is now made to FIG. 1 which illustrates a parking management communication system 10, constructed and operative in accordance with a preferred embodiment of the present invention. Parking management communication system 10 preferably includes a central control unit 12 having a data base 14, and a central interface unit 16. Central control unit 12 may include any type of data processing and information center, such as a central processing unit in a municipality. Data base 14 preferably includes any information pertinent to monitoring and/or billing use of parking facilities, such as parking facility identity, parking facility availability of a certain region, vehicle identification, user identification, billing information, and time related information of use of a parking facility. Data base 14 may also include law enforcement information, such as identity of stolen vehicles or previous parking or traffic violations.

Central interface unit 16 communicates with at least one user interface unit 20 via a wired or a wireless communication link, which may include telephone lines, wireless telephone links, communication network systems, such as the Internet, and/or citizen band radio. Depending on the type of communication chosen, central interface unit 16 may include, for example, any type of telephone exchange, LAN or transceiver. User interface unit 20 may include a public telephone 22, a mobile telephone 24 or a computer terminal 26 connected to a modem 28 or computer network (not shown), for example.

Additionally in accordance with a preferred embodiment of the present invention, communication system 10 includes billing apparatus 30 for billing a user for use of the parking facility. Billing apparatus 30 may include any type of system or software for generating debit notes and communicating debits to a bill collection facility, bank account, credit card, charge card, smart card, charge account or virtual money. Since parking charges are generally small, preferably a telephone account of the user is charged for use of the parking facility.

Often users of a parking lot have a monthly subscription for the use thereof In such a case, billing apparatus 30 may conveniently charge a user's account in accordance with predetermined terms of the subscription.

Further in accordance with a preferred embodiment of the present invention, communication system 10 includes a law enforcement interface unit 31 for monitoring authorized use of the parking facility. Law enforcement interface unit 31 preferably includes a receiver 32 which receives pertinent information from central interface unit 16, preferably by wireless communication, regarding, for example, parking facility availability of the region, vehicle identification, user identification, and time related information of use of a parking facility. Law enforcement interface unit 31 preferably includes a report generator 34 for generating a parking report 36 which may be served on site to users of the parking facilities. Alternatively or additionally, central control unit 12 may generate parking reports directly to a law enforcement agency or municipality.

Figure 2:
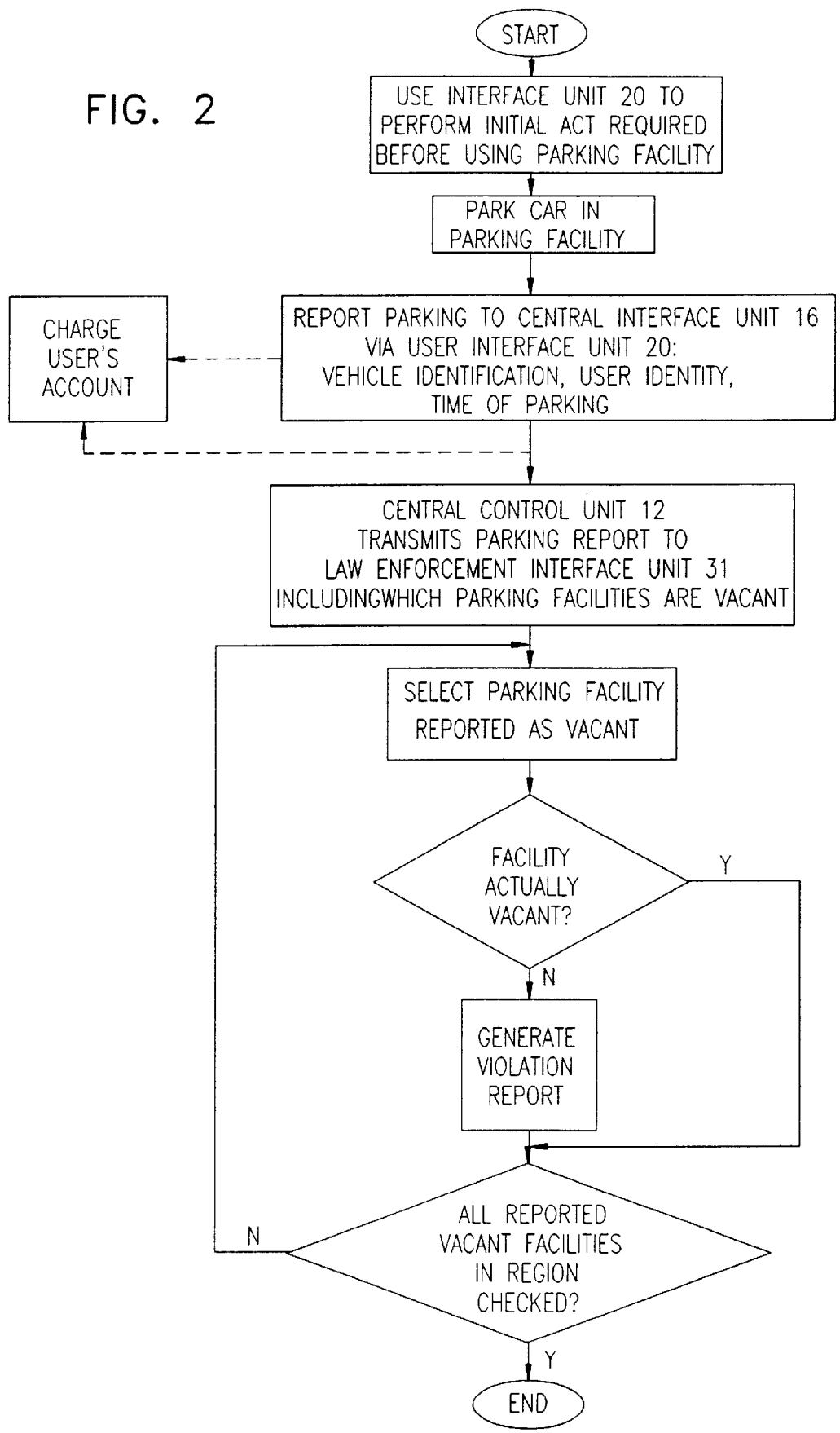
FIG. 2 is a simplified flow chart of a method for parking reporting and for monitoring use of a region of parking facilities, in accordance with a preferred embodiment of the present invention.

One typical operation of communication system 10 will now be described. Reference is now made to FIG. 2 which illustrates, in flow chart format, a method for parking reporting and for monitoring use of a region of parking facilities, in accordance with a preferred embodiment of the present invention. Optionally, upon reaching a parking facility, a user may use user interface unit 20, for example, mobile telephone 24, to perform some initial act required before using the parking facility. For example, the user may report his arrival, such as to central control unit 12 or to a parking attendant. Another example is a parking lot wherein entry is barred by a barrier operable by a wireless communication unit carried by authorized users. The user may use user interface unit 20 to communicate an authorization signal to lift the barrier to allow access to a parking facility.

A further example is a parking lot equipped with an elevator or other lifting devices for vehicles. The lifting device may be suitably designed for communication with a wireless communication unit carried by authorized users. The user may use user interface unit 20 to communicate an authorization signal to operate the lifting device.

After parking his car in a parking facility, the user reports parking to central interface unit 16 via user interface unit 20. The report may include vehicle identification, such as license plate number, and/or user identity, such as name or driver license number, parking facility identification number, time of parking and desired duration of parking. Alternatively, such as in a parking lot, the parking of the vehicle in the parking facility may be sensed by a sensor such as an optical sensor which reads vehicle identification data and automatically reports the parking of the vehicle to central interface unit 16. Another example of such sensors is a card reader which reads user identification data from a user identification card. Such a sensor may be used to check whether the vehicle has authorization to use the parking facility. For example, if the user of the vehicle reserved the use of the parking facility, the sensor may check if the vehicle which arrived indeed is the one for which a reservation was made.

Central control unit 12, via central interface unit 16, may transmit to law enforcement interface unit 31, typically held by a law enforcement officer, a report of which parking facilities are being used and which are vacant. In accordance with a preferred embodiment of the present invention, the exact location of the parking facility is not reported, and as will now be explained, is not even necessary for locating parking violations. Since a law enforcement officer has received a report from which he knows which parking facilities are supposed to be vacant, he merely has to select only those parking facilities which central control unit 12 reports as being vacant and file a traffic report against a vehicle using a vacant parking facility without authorization. This saves him from having to monitor the entire parking region. However, in accordance with another preferred embodiment of the present invention, the exact location of the parking facility may be reported. In such an event, each parking facility may be coded with an identification number for monitoring by central control unit 12.

It is appreciated that the law enforcement officer may also check from time to time parking facilities which central control unit 12 reports as being filled with authorization. This may be necessary to ensure that no user is trying to "cheat" the system. For example, authorization may be granted to use a given parking facility for only a predetermined period of time. Unscrupulous persons may try to make unauthorized use of the parking facility beyond this time, such as by telephoning to central control unit 12 unlawfully in the name of another person.

Alternatively, the vehicles in a given area may be identified by their license plates or other identification data, such as by a law enforcement officer who patrols the area and records the identification data or by an automatic data recording system. The vehicle identification data may then be verified to check if authorization has been granted for use of the parking facility.

The method may further include billing the user for use of the parking facility, such as charging the user's telephone account.

The user may report having finished using the parking facility to central interface unit 16 via user interface unit 20.

Figure 3:
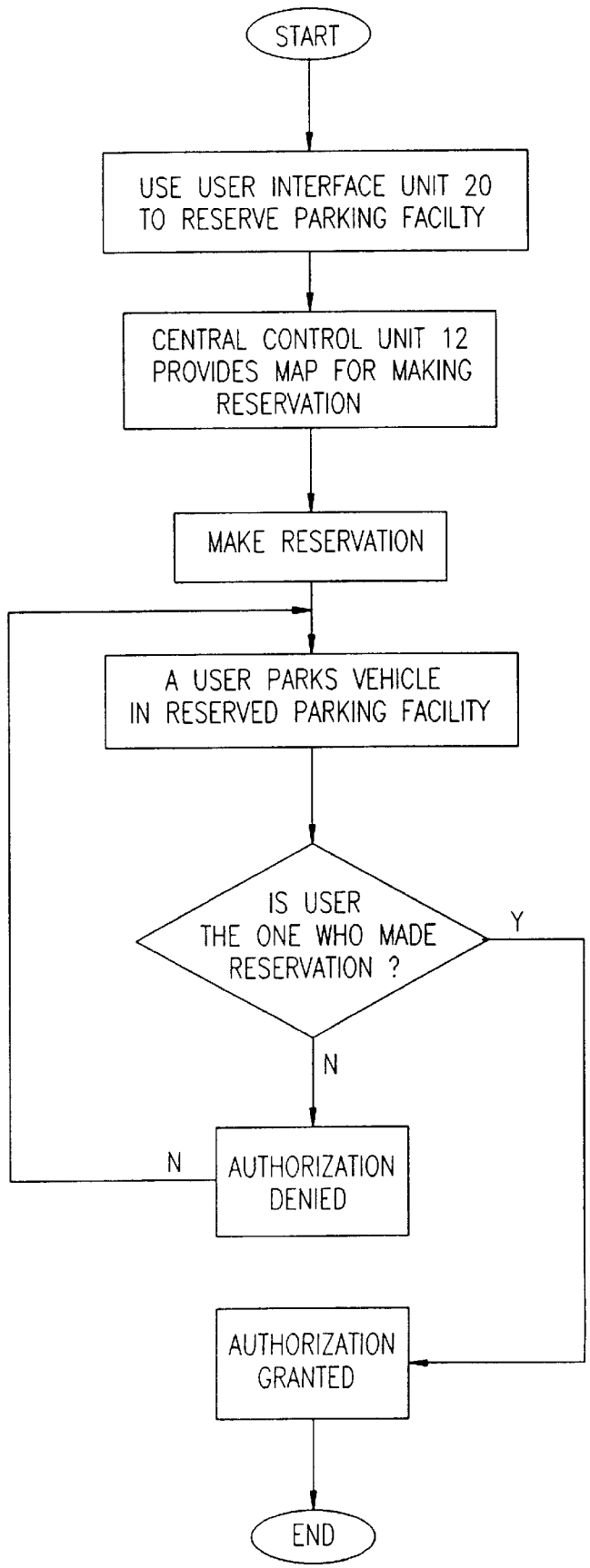
FIG. 3 is a simplified flow chart of a method for reserving a parking facility, in accordance with a preferred embodiment of the present invention.

Reference is now made to FIG. 3 which illustrates a simplified flow chart of a method for reserving a parking facility, in accordance with a preferred embodiment of the present invention. A user may reserve a parking facility, such as by using user interface unit 20, e.g., computer terminal 26 and modem 28, to communicate with central control unit 12, such as via the Internet. Central control unit 12 may provide the user with a map of a region in which the user is interested in parking. The user may select a parking facility and send a message to central control 12 to reserve the parking facility. Central control unit 12 then registers the reservation. The next time a potential user, other than the user who registered the reservation, wishes to park in the reserved parking facility and communicates with central control unit 12, the potential user will receive a message via central interface unit 16 that the facility is already reserved and not authorized for use. The user who registered the reservation, upon parking his vehicle in the reserved facility, reports his identification number to central control unit 12 and receives confirmation of authorization to park there.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the present invention is defined only by the claims which follow:

We claim:

1. A method for parking reporting comprising:

providing a plurality of parking spaces at a multiplicity of disperse parking facilities;

parking a vehicle at a parking space chosen from one of said parking spaces; and reporting to a central control unit, via a personal non-dedicated mobile communications device, an indication that said parking space is currently occupied.

2. The method according to claim 1 wherein said reporting via a non-dedicated mobile commnunications device is performed via a mobile telephone.

3. The method according to claim 1 wherein said reporting via a non-dedicated mobile communications device is performed by using a credit card to charge an account of a user of the parking space.

4. The method according to claim 1 wherein said reporting via a non-dedicated mobile communications device is performed by using an identification card to report an identity of a user of the parking space.

5. The method according to claim 1 wherein said reporting is performed by an operator of the vehicle.

6. The method according to claim 1 further comprising, before the step of parking, communicating a reservation request to said central control unit to reserve one of said parking spaces.

* * * * *